Oct. 25, 1955 W. E. PRITCHETT 2,721,655
HARVESTING MACHINE
Filed Feb. 16, 1953 3 Sheets-Sheet 1

INVENTOR
WESLEY E. PRITCHETT
BY *Lockwood, Galt, Woodard, & Smith*
ATTORNEYS

Oct. 25, 1955  W. E. PRITCHETT  2,721,655
HARVESTING MACHINE

Filed Feb. 16, 1953  3 Sheets-Sheet 2

INVENTOR
WESLEY E. PRITCHETT
BY *Lockwood, Galt, Woodard, & Smith*
ATTORNEYS

Oct. 25, 1955     W. E. PRITCHETT     2,721,655
HARVESTING MACHINE

Filed Feb. 16, 1953     3 Sheets-Sheet 3

INVENTOR
WESLEY E. PRITCHETT
BY *Lockwood, Galt, Woodard, & Smith*
ATTORNEYS

United States Patent Office 2,721,655
Patented Oct. 25, 1955

2,721,655

HARVESTING MACHINE

Wesley E. Pritchett, Fort Wayne, Ind.

Application February 16, 1953, Serial No. 337,177

5 Claims. (Cl. 209—21)

The present invention relates to harvesting machines and more particularly to an improvement in harvesting machines as disclosed and claimed in application Serial No. 216,793, filed March 21, 1951, now Patent No. 2,698,039, by Wesley E. Pritchett, inventor.

As explained in the previous, above-identified application, conventional harvesting machinery possesses certain operating deficiencies and disadvantages which include (a) inefficient and incomplete harvesting of all the available crop, and (b) expense involved in mechanical and high original and maintenance costs.

The specific embodiment disclosed in the preceding application included a seed-separating device equipped with a centrally positioned exhaust tube mounted in the upper end thereof. The air stream bearing the whole seed was introduced at the lower end of the device, directed upwardly, then deflected downwardly, and lastly directed upwardly through the exhaust tube. During this last change of direction upwardly of the air stream, some of the heavier-than-air particles would drop out of the air stream, and after a period of operation, would collect and tend to clog the system, requiring a cleaning of the device before continuation of further operation. By means of the present invention, the difficulty just noted is overcome, and further improvements thereover have been effected which will become apparent from the following description.

It is an object of this invention to provide a novel seed-separating or harvesting machine having a minimum of movable parts.

It is another object of this invention to provide a harvesting machine which will produce a more copious harvested crop yield than is achieved by other known harvesting machines.

It is still a further object of this invention to provide a seed-separating device which operates to separate the seed from the hulls, throwing the hulls into a spiral stream of air which first is moving upwardly, then is deflected downwardly and into an exhaust conduit which carries the hulls and similar foreign matter from the device.

It is yet another object of this invention to provide a seed-separating device utilizing a spiral stream of air which travels generally in one axial direction, during which travel the seeds are separated from the hulls, and which is thereafter deflected oppositely and interiorly to be exhausted through suitable conduit means which extends generally opposite to that of the initial stream travel.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
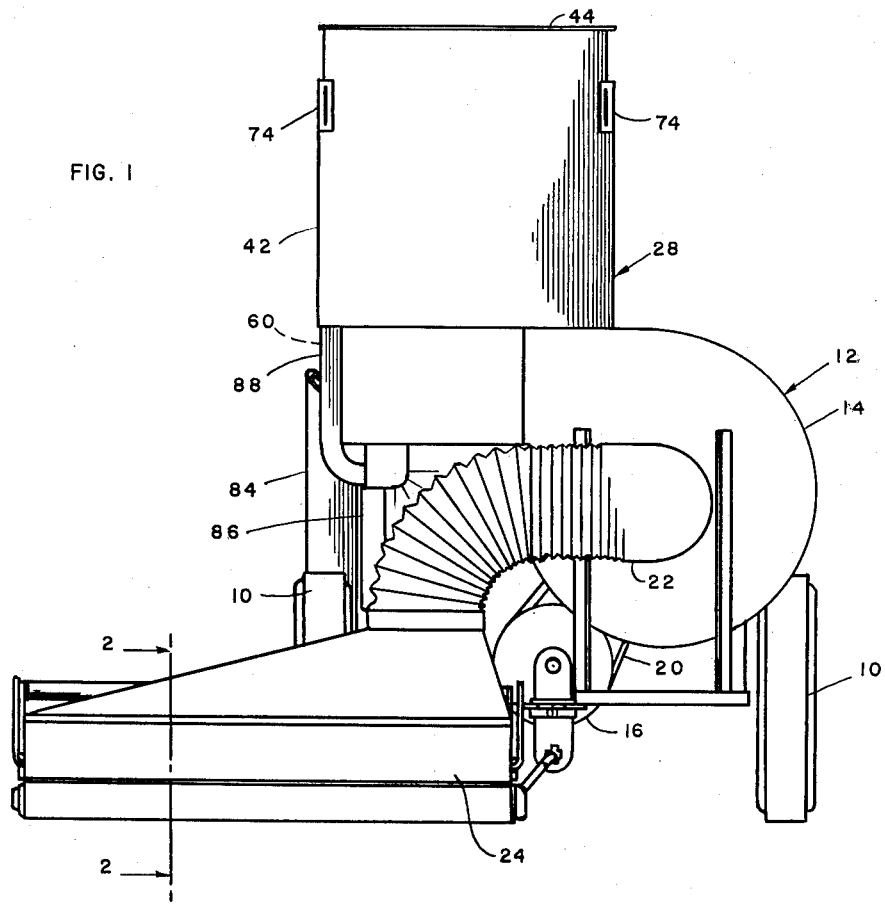
Fig. 1 is a front elevation of an embodiment of this invention.
Figure 2:
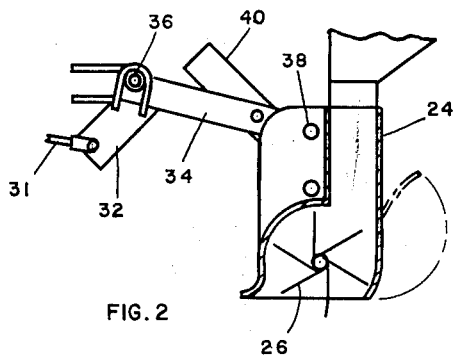
Fig. 2 is a fragmental illustration taken substantially on section line 2—2 of Fig. 1.
Figure 3:
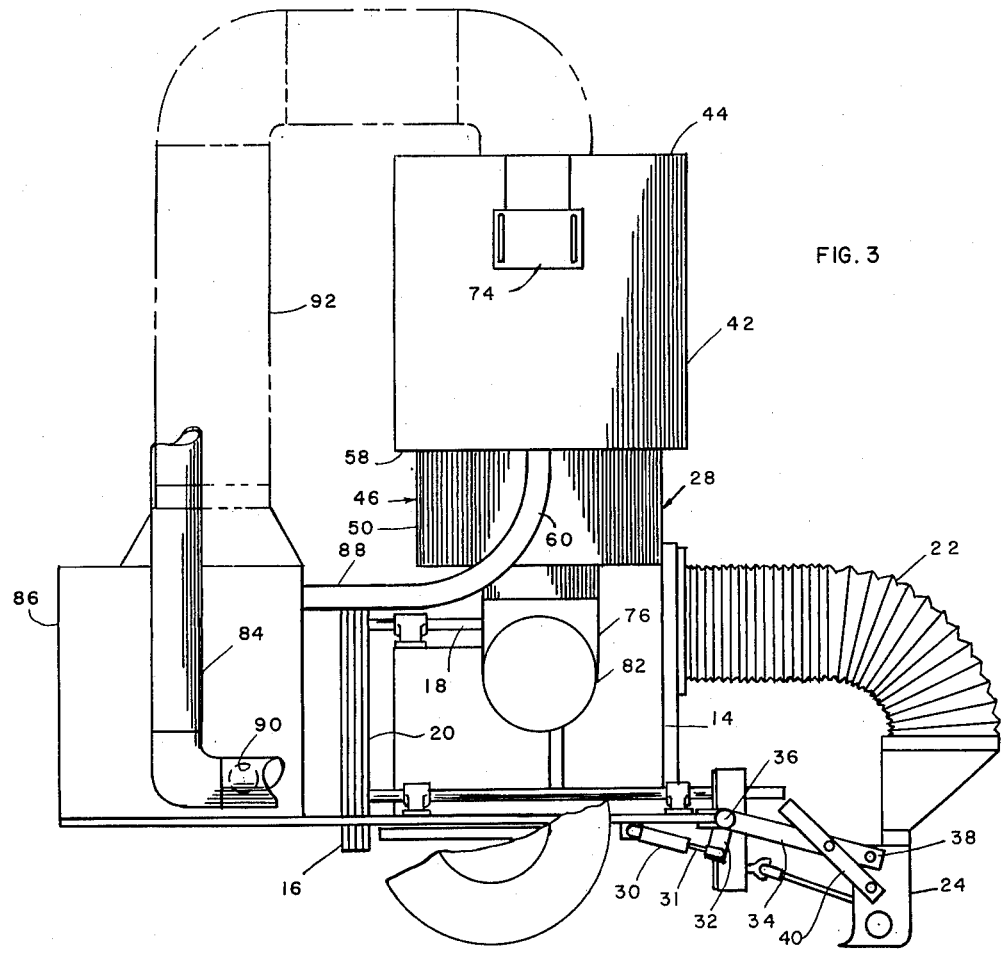
Fig. 3 is a side elevation, partially broken away for clarity, and showing an alternative construction in phantom lines.

Referring to the drawings, and more particularly to Figs. 1 and 3, a harvesting machine constituting a specific embodiment of this invention is shown as being transportable by means of wheels 10 mounted on suitable chassis frame work. A fan, generally indicated by the reference numeral 12, is suitably supported inside a fan housing 14, the fan being operated by suitable power take-off mechanism 16 which is coupled to a fan shaft 18 by means of V-belts or the like 20. Other means may be employed for driving the fan, such as by means of a tractor power take-off or an integrally mounted engine. The blower 12 is connected by means of a flexible conduit 22 to a hood 24 which supports a conventional rotary beater 26. During the operation of the fan 12, a suction is developed in the hood 24 which serves to lift the crop particles from the ground or crop stems and feed them into the separating mechanism. Rotation of the beater 26 serves to dislodge and stir up the crop particles thereby facilitating the lifting action, a stream of air bearing the harvested seeds and extraneous foreign matter being circulated through the blower system and into the seed-separating device generally indicated by the reference numeral 28.

Since for different crops and harvesting conditions, the harvesting efficiency depends upon the elevated position of the hood 24 above the ground, a hydraulic power cylinder 30 is connected by means of suitable linkage to the hood 24 for raising and lowering the same. This linkage in Fig. 3 is illustrated as comprising two common levers 32 and 34 which are suitably secured to a rockable shaft 36, the operating rod 31 of the cylinder 30 being connected to the outer end of the lever 32. Reciprocation of the piston (not shown) in the cylinder 30 serves to raise and lower the outer end of the lever 34 which is pivotally connected at 38 to the hood 24. For stabilizing the vertical motion of the hood 24, a link 40 is pivotally connected as shown to the lever 34 and to the hood 24.

Figure 6:
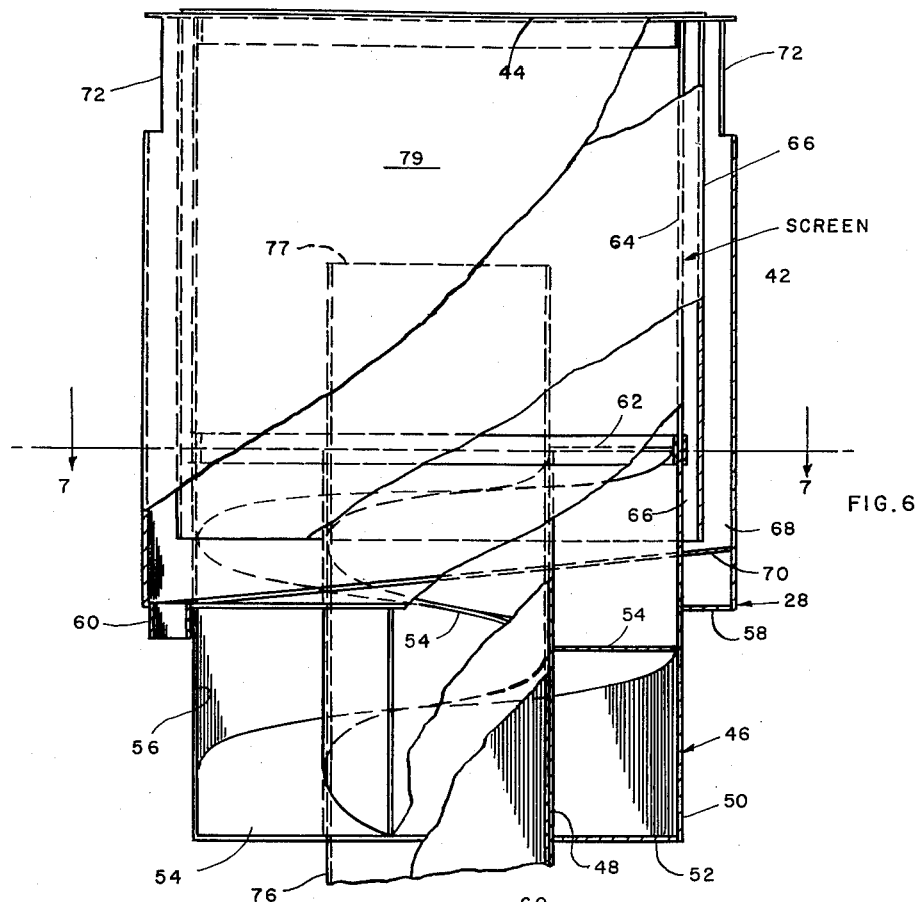
Fig. 6 is a partial longitudinal section of the seed-separating device of the preceding figures, certain elements thereof being broken away and sectioned for clarity.
Figure 7:
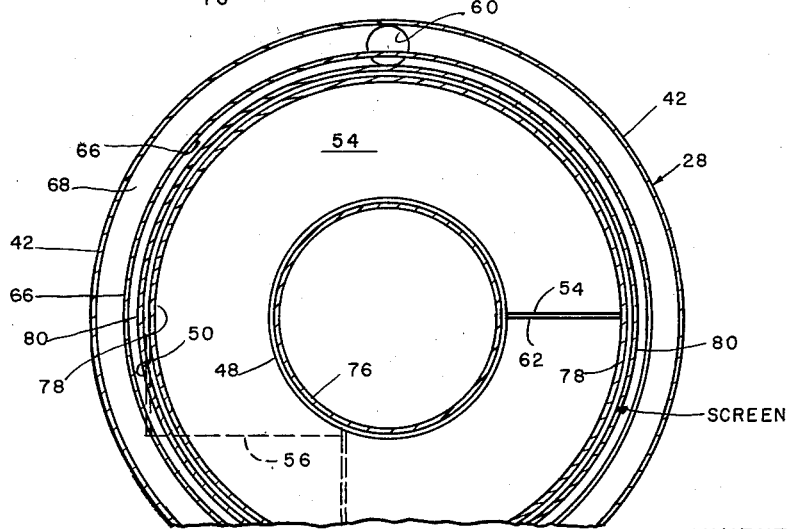
Fig. 7 is a cross section taken substantially along the section line 7—7 of Fig. 6.

Referring now to Figs. 6 and 7, the seed-separating device 28 is comprised of an outer casing or enclosure 42 having a closure 44 at the upper end thereof. At the lower or opposite end of the casing 42 is provided a helical or spiral air conduit generally indicated by reference numeral 46, this conduit being comprised essentially of coaxially arranged inner and outer walls 48 and 50, respectively, which are closed at the bottom end by an annular plate 52 and which support therebetween a helical baffle 54. The combination of the inner and outer walls 48 and 50, and the baffle 54 provides a helically shaped air conduit which serves to impart a whirling or rotating motion to an air stream delivered to one end and exhausted from the other end thereof. A rectangular opening 56 constitutes the inlet end of the helical conduit, and is connected to the delivery side of the blower 12 by means of suitable air tight connections.

An annular bottom plate 58 provided between the lower end of the casing 42 and the adjacent peripheral surface of the conduit wall 50 is equipped with a seed discharge port 60. For purposes of convenient illustration, the port 60 in Fig. 6 is shown 90 degrees displaced from the proper position as indicated in the other figures.

The conduit walls 48 and 50, and the spiral conduit formed thereby, project into the interior of the casing 42 a suitable distance as will become apparent from the following description, and terminate adjacent the conduit delivery port indicated by the reference numeral 62.

Extending coextensively upwardly from the upper end of the conduit wall 50 is a perforated member or screen (labeled Screen) 64 which abuts or may be suitably secured at its upper end to the closure member 44 of the casing 42. A solid, tubular baffle member 66 is supported from the closure 44 in coaxial spaced relation with respect to the screen 64 and the wall of the casing 42 thereby defining first and second annular chambers 66 and 68 which communicate with each other at the lower extremities thereof. An inclined bottom 70 for the casing 42 feeds toward the seed discharge port 60. Dust ports or vents 72 are provided in diametrically opposite portions in the casing 42 near the upper end of the latter, and may be controlled by means of vent doors 74 as seen more clearly in Fig. 3. Thus a stream of air fed into the interior of the screened chamber will be conducted downwardly through the annular chamber 66, then will be turned upwardly through chamber 68 and exhausted from the vent openings 72.

An exhaust tube 76 is telescopically received within the conduit wall 48 and is axially adjustable therein. The upper end 77 of this tube 76 extends into the interior of the separating chamber 79 as shown by the dashed lines in Fig. 6.

Two suitable clamping bands 78 and 80 serve to attach the lower end of the screen 64 to the upper end of the conduit wall 50 and also serve as a terminating support for the upper end of the spiral baffle 54. Obviously any other suitable structure may be used for providing a connection between the conduit wall and screen 64 and for supporting the upper end of the spiral baffle 54.

The depending extremity of the tube 76 may be equipped with an elbow 82 for providing a convenient connection to accessory apparatus, such as the grain vent pipe 84 by means of which separated grain may be conveyed from the grain bin 86. A suitable conduit or pipe 88 is connected between the seed-discharge port 60 of the casing 42 and the upper end of the bin 86 whereby the harvested grain produced in the separating device 28 may be collected.

A gate or opening 90 provided in the bottom of the bin 86 is made selectively operable for communication with the grain exhaust pipe 84 for a purpose which will be explained in more detail hereinafter.

In the operation of the device, the machine is transported through the crop field with the hood 24 positioned at the proper elevation. With the blower 12 operating, whole seeds and possibly other foreign matter will be sucked up through the hood and delivered to the inlet 56 of the air conduit 46. The spiral shape of this air conduit 46 serves to impart a rotary motion to the air stream which enters the separating chamber at the end 62 of the spiral baffle 54 and rotates therethrough until it strikes the closure plate 44. In the preferred arrangement, the air stream makes four complete revolutions before it strikes the closure 44. By reason of the centrifugal force, seed particles in the air stream are pressed against the screen 64 and by force of the air leakage through the screen will be separated from the hulls thereof. With the mesh size of the screen 64 suitably selected, the hulled seeds will pass therethrough and will gravitate through the annular chamber 66 to the inclined bottom 70 and thence from the seed discharge port 60. The hulls and particles which are too large to pass through the screen are carried upwardly against the closure 44. After the air has completed its upward flow, it can flow only downwardly in the central portion of the chamber 79, generally inside the spiral stream of the upwardly moving air. The path of this return flow is necessarily shortened, whereby the velocity of the flow increases. This increased velocity increases the centrifugal force on the suspended unhulled seeds, and causes the seeds which have not passed through the screen in the first cycle to be thrown outwardly and into the upwardly moving, separating stream. Particles contained within this return flow, and which are not of sufficient weight to be thrown outwardly against the screen 64 are intercepted by the mouth 77 of the tube 76 and conducted through the tube 76, elbow 82, and suitable accessory conduit, to the atmosphere. The particles suspended in the return spiral are chiefly composed of chaff, hulls and other debris, the heavier seed particles passing through the screen 64 and being collected from the seed discharge port 60.

Since a certain quantity of foreign material, such as dust, which is smaller than the seed will be thrown through the screen 64, the normal current of air which passes down the annular chamber 66 and turns upwardly through the chamber 68 and out of the vent ports 72 will carry these lighter particles out of the system, thereby providing a secondary cleansing or separating action.

For different types and weights of crops, adjustment of the tube 76 within the seed-separating chamber is necessary for obtaining efficient and thorough separating action. The amount of material re-circulated through the system is governed primarily by the height or position of this exhaust tube 76 in the separating chamber. The higher the tube end 77 is positioned in the chamber, the smaller the number of passes the heavier material will make through the separating air stream, and similarly, the lower the tube is positioned, the greater the number of separating passes. For efficient operation, the exhaust tube should be raised to the highest possible point which will provide a thorough separating operation.

As an auxiliary feature of this invention, the bin 86 may be emptied by lifting the hood 24 out of operative position, closing the dust ports 72, connecting a flexible pressure hose between the exhaust tube elbow 82 and the right-hand end of the grain bin pipe 84, and opening the gate 90. The blower 12 is now operated at a speed to lift the seed or grain which flows into the grain pipe 84, this air stream carrying the seed upwardly through the pipe 84 and into a suitable container.

Figures 4, 5:
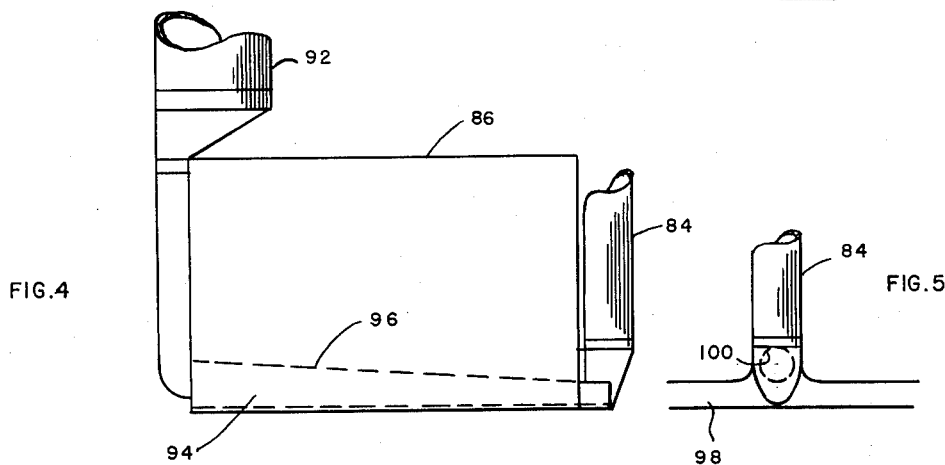
Fig. 4 is a rear view of the grain bin of Fig. 3 showing further details of the alternative construction of Fig. 3.
Fig. 5 is a partial front view of Fig. 4.

A different emptying arrangement is illustrated in Figs. 3, 4 and 5 as comprising a suitable conduit 92 which opens through the enclosure 44 of the casing 42 and connects with a chamber 94 (Fig. 4) provided beneath the false bottom 96 in the grain bin 86. The forward end of this chamber 94 opens into a manifold 98 which is connected with the interior of the grain bin by means of a gate 100. The grain bin pipe 84 extends upwardly from the manifold 98. With the gate 100 open, grain normally will flow into the manifold from which it is conducted upwardly through the pipe 84 by means of an air stream delivered to the chamber 94 through the conduit 92 which leads to the upper end of the casing 42. This operation is accomplished by lifting the hood 24, closing the dust ports 74, opening the gate 100, and operating the fan 12.

Included in the improvements of this invention over the one of the previous application, re-arrangement of the exhaust tube 76 for conducting the exhaust material downwardly rather than upwardly tends to prevent the settling of chaff and foreign material over the machine and operator. Also shortening of air passage between fan and separator tends to eliminate settling of material and clogging of system.

While the present and previous inventions have been explained in connection with the harvesting of grain crops, it has been established by suitable experiments that the present invention will serve as a harvester for forage and similar grass crops. For this purpose, the screen 64 is simply replaced by a solid tubular member, the exhaust elbow 82 is capped, the dust ports 72 are closed, and a connecting elbow is fitted to the top 44 of the separator to conduct material from the separating chamber to a suitable towed conveyance.

Further, this machine may be used as a vacuum unloader for unloading grain and forage containers to fill overhead bins, sacks, or mows. This is accomplished by disconnecting the fan to the pick-up hose 22 and connecting a hose of sufficient length to extend to the container to be emptied. For loading or unloading forage, the separator unit may be disconnected and the exhaust pipe fastened directly to the fan outlet.

One distinct advantage of this invention resides in the fact that the seed is held in contact with the screen by centrifugal force instead of by gravity, whereby the machine may be efficiently and reliably operated on grades as well as level terrains.

What is claimed is:

1. A seed-separating device comprising an enclosure, a spiral air conduit which opens into one end of said enclosure and serving to deliver a rotary stream of air to the interior of said enclosure, a seed-separating perforate member supported by said enclosure and lying in the radial path of said stream of air whereby heavier-than-air particles borne by said stream will be thrown against said perforate member, a tubular baffle spaced and surrounding said perforate member, a deflecting member mounted in the opposite end of said enclosure and serving to deflect the stream oppositely, an exhaust conduit member mounted coaxially within said air conduit and extending into said enclosure and into the path of the air stream deflected by said deflecting member, and a seed-collecting chamber communicating with the space between said perforate member and said tubular member to which seed passing through said perforate member may gravitate.

2. A seed-separating device comprising an enclosure, a spiral air conduit which opens into one end of said enclosure and serving to deliver a rotating stream of air to the interior of said enclosure, a seed-separating perforate member supported by said enclosure and lying in the radial path of said stream of air whereby heavier-than-air particles borne by said stream will be thrown against said perforate member, a tubular baffle spaced from and surrounding said perforate member, a deflecting member mounted in the opposite end of said enclosure and serving to deflect the stream oppositely, an exhaust conduit member movably mounted coaxially within said air conduit and extending into said enclosure and into the path of the air stream deflected by said deflecting member, and a seed-collecting chamber communicating with the space between said perforate member and said tubular member to which seed passing through said perforate member may gravitate.

3. A seed-separating device comprising a cylindrical enclosure, a spiral air conduit coaxially mounted in one end of said enclosure and serving to deliver a helical stream of air to the interior thereof, a perforate separating member coaxially supported inside said enclosure and surrounding the helical stream of air, the opposite end of said enclosure being closed so as to deflect said helical stream of air in the opposite direction and to provide a second stream of air which is travelling axially opposite to the helical stream, a tubular baffle member spaced from and surrounding said perforate member, the space between said perforate member and said baffle member being open adjacent said one enclosure end to provide a discharge port for seed, said baffle member being spaced from the wall of said enclosure to provide an annular dust chamber opening into said discharge port adjacent said one enclosure end, and a tubular member coaxially supported in said one enclosure end and projecting into the interior of said enclosure to intercept and to conduct said second stream of air from said enclosure.

4. A seed-separating device comprising a cylindrical enclosure, a spiral air conduit axially mounted in one end of said enclosure and serving to deliver a helical stream of air to the interior thereof, a perforate separating member coaxially supported inside said enclosure and surrounding the helical stream of air, the opposite end of said enclosure being closed so as to deflect said helical stream of air in the opposite direction and to provide a second stream of air which is travelling axially opposite to the helical stream, a tubular baffle interposed between and spaced from said perforate member and the wall of said enclosure to provide two coaxial chambers, said chambers being closed at said opposite end but open at the other end to provide communication therebetween, and a tubular member coaxially supported with respect to said air conduit and projecting into the interior of said enclosure to intercept and to conduct said second stream of air from said enclosure.

5. A seed-separating device comprising a cylindrical enclosure, a spiral air conduit axially mounted in one end of said enclosure and serving to deliver a helical stream of air to the interior thereof, a perforate separating member coaxially supported inside said enclosure and surrounding the helical stream of air, the opposite end of said enclosure being closed so as to deflect said helical stream of air in the opposite direction and to provide a second stream of air which is travelling axially opposite to the helical stream, a tubular baffle supported within said enclosure and surrounding in spaced relation said perforate member to provide a first annular chamber whereby particles passed by said perforate member will impinge thereagainst and gravitate toward said one end, and a second annular chamber provided between the outer wall of said enclosure and said tubular baffle and having its lower end communicating with said first annular chamber, both of said annular chambers being closed adjacent said opposite enclosure end, dust ports being provided in said enclosure wall whereby dust particles may be carried from between said perforate and tubular members, passed through said second annular chamber, and exhausted from said dust ports.

References Cited in the file of this patent

UNITED STATES PATENTS

| 429,347 | Haskell | June 3, 1890 |
| 474,491 | Walter | May 10, 1892 |
| 940,827 | Sheward | Nov. 23, 1909 |